Sept. 3, 1963
J. E. GARRETT
3,102,377
HAY RAKE TOOTH MOUNTING MEANS
Filed Dec. 14, 1961
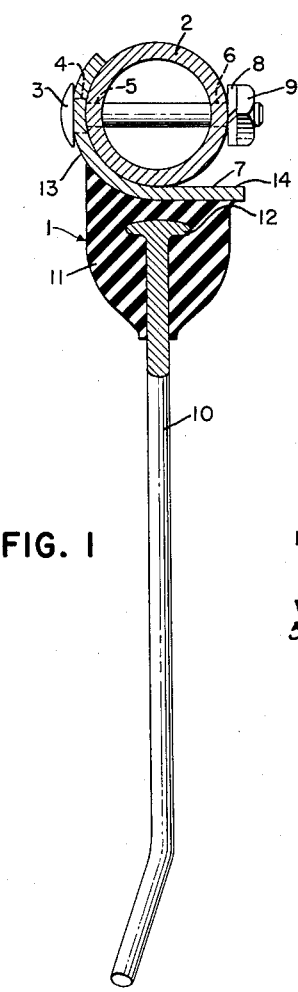
FIG. 1
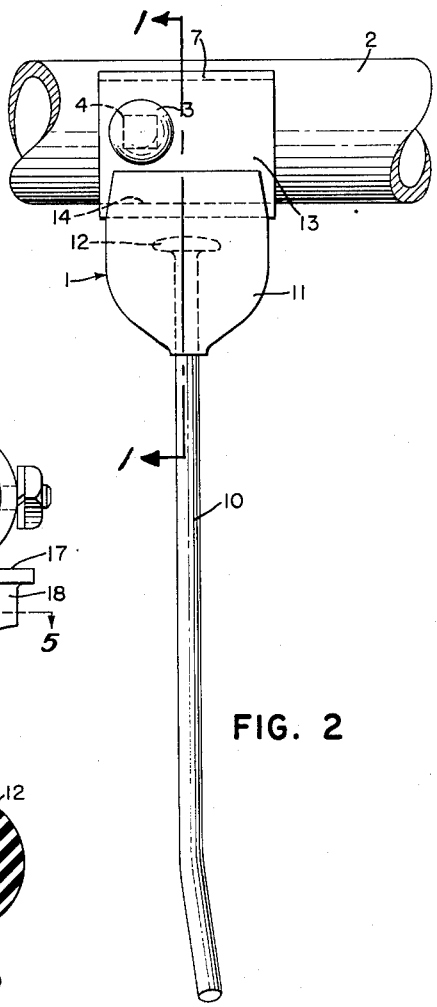
FIG. 2
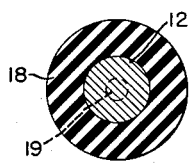
FIG. 4
FIG. 5
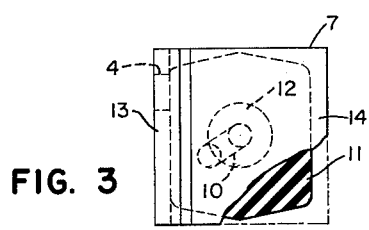
FIG. 3
*INVENTOR.*
JOHN E. GARRETT
BY
*J. B. Holden*
ATTORNEY

United States Patent Office 3,102,377
Patented Sept. 3, 1963

3,102,377
HAY RAKE TOOTH MOUNTING MEANS
John E. Garrett, St. Marys, Ohio, assignor to the Goodyear Tire & Rubber Company, Akron, Ohio, a corporation of Ohio
Filed Dec. 14, 1961, Ser. No. 159,262
6 Claims. (Cl. 56—400)

This invention relates to hay rakes or similar agricultural equipment and more particularly to means for mounting the teeth on the rake bar of such equipment.

In recent years there has been considerable work done in devising means to attach the teeth to the rake bar. It is necessary that the teeth be mounted so as to be deflected by contact with any obstruction and resultingly bypass it but not during contact with the crop. One means of providing the necessary resilience for the rake tooth mounting is to embed the tine in a block of rubber or other elastomeric material. One end of the block is attached to a metal clip which in turn is fixed to the rake bar and the invention features a clip which provides adequate support for the rubber block and is easily attached to or detached from the rake bar. It is, therefore, an object of this invention to provide an inexpensive and sturdy means of attaching a hay rake tooth to the rake bar.

Another object of the invention is to provide a hay rake tooth mounting that is easily applied to the rake bar.

A further object of the invention is to provide a mounting that permits the tooth to deflect to avoid obstructions yet not be deflected by normal raking operations.

These and other objects and advantages of this invention will become apparent hereinafter as the description thereof proceeds, the novel features, arrangements and combinations being clearly pointed out in the specification as well as the claims thereunto appended.

In the drawings:

FIG. 1 is a sectional view taken along line 1—1 of FIG. 2 and illustrating a hay rake tooth in position on the rake bar;

FIG. 2 is an elevation view of the invention shown in FIG. 1;

FIG. 3 is a plan view with broken section of the hay rake tooth;

FIG. 4 is partial section of a modification of the invention; and

FIG. 5 is section taken on line 5—5 of FIG. 4.

In FIGS. 1, 2 and 3 a hay rake tooth 1 is mounted on a tubular rake bar 2 by means of a bolt 3 passing through aligned openings 4, 5 and 6 in the mounting clip 7 and rake bar 2 respectively and secured by the lock washer 8 and nut 9. As shown, the openings 5 and 6 in rake bar 2 lie on the horizontal center line when the bar is mounted in the operating position on the hay rake machine although in some instances, the line of openings 5 and 6 may be at a slight angle with the horizontal center line.

The hay rake tooth 1 as shown includes the rigid metallic clip 7 on which the tine 10 is mounted through the block 11 of an elastomeric material such as rubber. As shown, the tine 10 has an upset head portion 12 to assist in securely embedding tine 10 to the elastomeric material.

The clip 7 is of substantially J-shaped configuration with a curved end portion 13 and a straight portion 14 adjoined thereto. In order to provide adequate support of the clip the area of contact between the clip 7 and the rake bar 2 should include at least a 120° arcuate portion of the rake bar surface, with a maximum contact of a 180° arc. Clip 7 is attached to the rake bar 2 so that the end of the curved portion 13 to which the straight portion 14 adjoins is substantially on the vertical center line of the lower surface of rake bar 2. As shown, the opening 4 in the curved portion 13 is at the maximum extent thereof which is substantially 90° displaced from the juncture of the straight and curved portions 14 and 13 respectively, although the opening 4 may be positioned as much as 45° in either direction from the position shown. Rubber block 11 is firmly adhered to clip 7 and as shown is of a width substantially equal to that of the diameter of the rake bar. As a result, the rubber is adhered to both the straight portion 14 and partially a portion of curved portion 13 of clip 7. Tine 10 is embedded in block 11 so that the axis thereof is substantially normal to the axis of rake bar 2 and the surface of straight portion 14 of clip 7. As best seen in FIG. 3, the cross-sectional shape of rubber block 11 is rectangular with a slight bulge in each end portion. The particular configuration of the cross-section of rubber block 11 may be of any desired configuration but preferably the tine 10 is embedded substantially centrally thereof so that the tine will deflect similarly in all directions.

In the modification shown in FIGS. 4 and 5, the clip 15 includes a curved portion 16 of 180° with straight portion 17 extending from one end of curved portion 16. A block 18 of elastomeric material is adhered to clip 15 in the same manner as previously described in connection with tooth 1. A tine 19 is embedded in block 18 so as to extend normal to the rake bar and the surface of straight portion 17 of clip 15. The cross-sectional shape of rubber block 17, as illustrated, is circular with tine 19 being embedded centrally thereof.

In either of the forms of the invention shown the rigid clip which forms the means to attach the rake tooth to the rake bar engages a substantial portion of the surface of the rake bar but is only fixed to the rake bar at a single point which preferably is at the maximum extent of the curved portion of the clip. The clip of either of the forms of the invention shown may be used interchangeably with the present mountings of hay rake teeth, thus eliminating the necessity of redrilling or providing a different rake bar to which the teeth are attached.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. Mounting means for attaching a hay rake tooth to a rake bar of a hay rake machine comprising a rigid clip of J-shaped configuration having a curved portion and a leg portion extending from one end thereof with the curved portion adapted to receive the rake bar, a block of vulcanized elastomeric material having one end adhered to the leg portion of said clip, a tooth having one end embedded in said block and projecting from the end of the block opposite to the attached end in a direction normal to the leg portion of the clip with the axis of the tooth being in substantial alignment with the center of the rake bar and normal to the length thereof, an aperture in the curved portion of the J, and fastening means extending through said aperture and engaging said bar to fix said clip to said bar.

2. Mounting means for attaching a hay rake tooth to a rake bar of a hay rake machine comprising a rigid metallic clip of J-shaped configuration having a curved portion and a leg portion extending from one end thereof with the curved portion adapted to seat against the side of said rake bar with the leg portion on the under side thereof, a block of vulcanized elastomeric material having one end thereof adhered to the leg portion of said clip, a tooth having one end embedded in said block and extending in a direction normal to the leg portion in substantial alignment with the axis of the rake bar, an aperture in said curved portion in alignment with horizontally aligned, diametrically opposed apertures in said rake bar and fastening means extending through said apertures to attach said clip to said rake bar.

3. Mounting means for attaching a hay rake tooth to a rake bar of a hay rake machine comprising a rigid clip elongated axially of the bar and having a curved portion for receiving one side of the bar and a straight portion extending from one side of the curved portion on the under side of the bar, a block of vulcanized elastomeric material having one end attached to the straight portion of said clip, a tooth having one end embedded in said block and extending from the opposite end thereof in a direction substantially normal both to the surface of said straight portion and said bar, aligned openings in said curved portion and rake bar and securing means passing through said aligned openings to mount said tooth on said rake bar.

4. Mounting means for attaching a hay rake tooth to a rake bar of a hay rake machine comprising a rigid clip elongated axially of the bar and having a curved portion for receiving one side of the bar and a straight portion extending from one side of the curved portion on the under side of the bar, a block of vulcanized elastomeric material having one end adhered to the straight portion of said clip, a tooth having one end embedded in said block and extending from the opposite end thereof in a direction substantially normal both to the surface of said straight portion and said bar, aligned openings in said curved portion and rake bar, the axis of said aligned openings being substantially parallel to said straight portion of the rigid clip, and securing means passing through said aligned openings to mount said tooth on said rake bar.

5. A device as claimed in claim 3 in which the curved portion is 120° to 180° in extent from its juncture with the straight portion.

6. A device as claimed in claim 3 in which the aperture in said curved portion is between 45° and 135°, displaced from the straight portion.

References Cited in the file of this patent
UNITED STATES PATENTS 2,909,889    Gustafson _____ Oct. 27, 1959

FOREIGN PATENTS 1,193,150    France _____ Apr. 27, 1959